March 19, 1929.  C. A. JOHNSON ET AL  1,705,768
SWITCH BOX MOUNTING
Filed Feb. 23, 1926
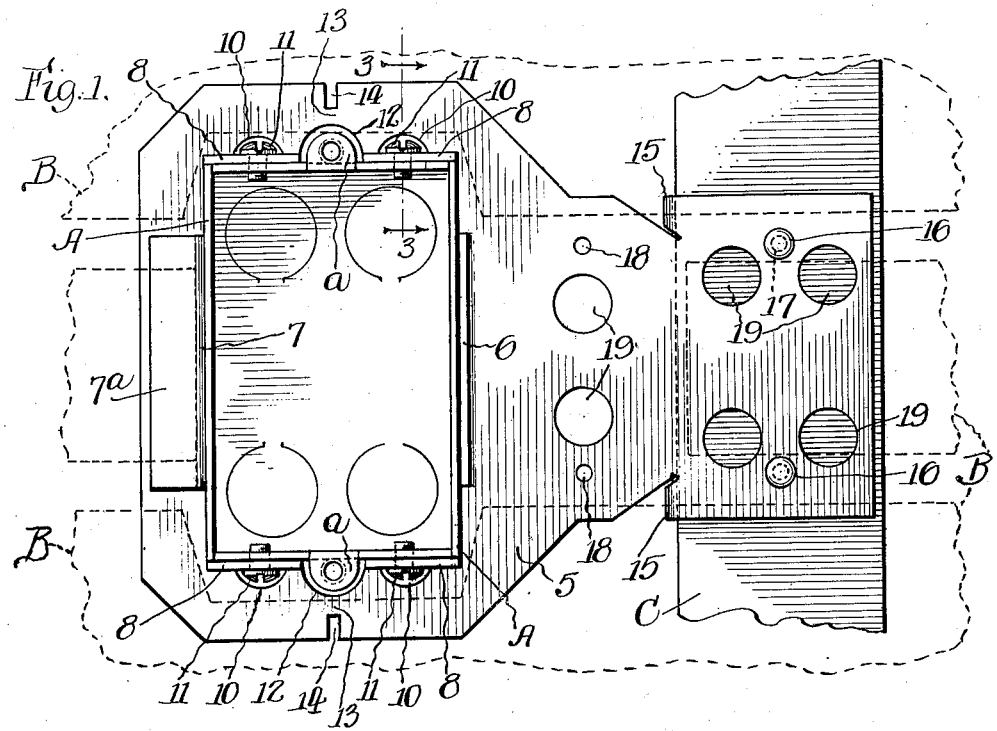
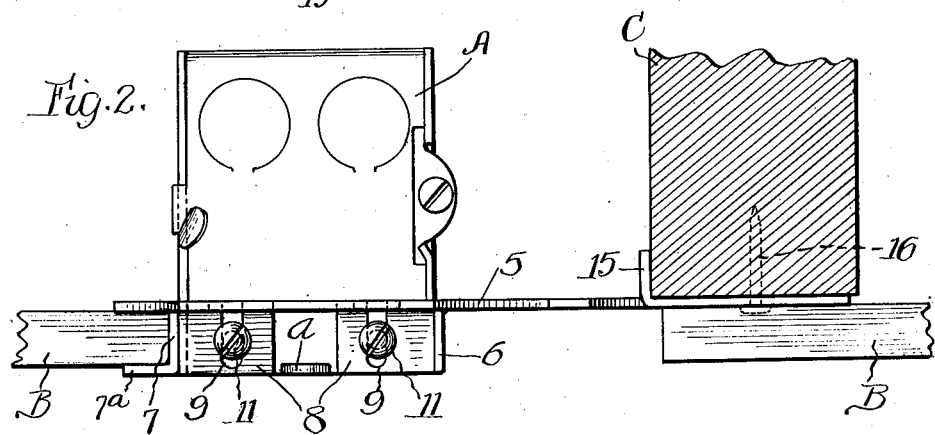
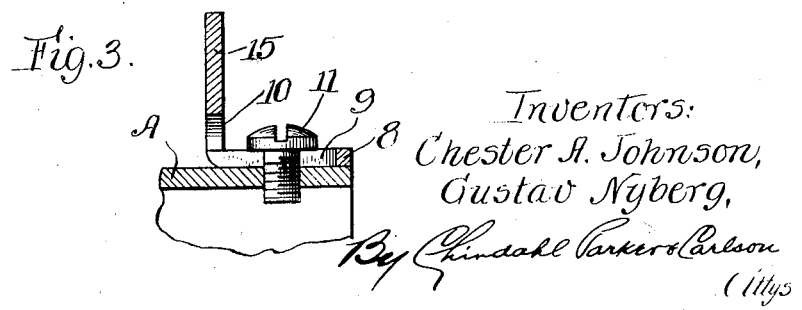
Inventors:
Chester A. Johnson,
Gustav Nyberg, Patented Mar. 19, 1929.

1,705,768

UNITED STATES PATENT OFFICE.

CHESTER A. JOHNSON AND GUSTAV NYBERG, OF CHICAGO, ILLINOIS, ASSIGNORS TO CHICAGO JEFFERSON FUSE & ELECTRIC COMPANY, OF CHICAGO, ILLINOIS, A CORPORATION OF ILLINOIS.

SWITCH-BOX MOUNTING.

Application filed February 23, 1926. Serial No. 89,851.

Our invention relates to a support for switch or outlet boxes such as are used in electrically wiring buildings. Heretofore such boxes have been supported either by a more or less complicated arrangement of braces and supports necessitating several parts for each box, or they have been supported by the lath which, due to the opening made to accommodate the box, has already been materially weakened. It is one of the objects of our invention to provide an improved mounting or support for a switch box which is arranged to be fastened directly to the studding, which is unitary in structure, can be easily and quickly applied, and will furnish rigid support to the severed and weakened lath.

Another object is to provide such a mounting with a means of adjustment by which to position the open face of the box flush with the outer face of the wall, so as to compensate for varying thicknesses of the plaster.

Another object is to provide a complete mounting of the character described which is very simple and cheap to manufacture.

Further objects and advantages of the invention will be apparent from the following description taken in connection with the accompanying drawings, in which Figure 1 is a front elevational view showing a switch box secured in a wall by means of my improved mounting.

Fig. 2 is a top plan view of Fig. 1.

Fig. 3 is an enlarged cross-sectional view of the adjusting and locking means taken on a line 3—3 of Fig. 1.

In the preferred form shown in the drawings, the mounting comprises a flat plate 5 having at one end a frame-like portion defining an opening of any size or shape to accommodate a switch box A. This frame portion has along the vertical edges of the opening (Fig. 1) a pair of integral perpendicular flanges 6 and 7 extending forwardly therefrom, and the free edge 7ª of the flange 7 is bent to lie parallel with the plate 5 as shown in Fig. 2, thereby forming a channel or pocket between the edge 7ª and the plate to receive the unsupported severed ends of laths B. At the upper and lower ends of the frame portion are two pairs of lugs 8 extending perpendicularly outward from the plate and provided with slots 9 registering with notches 10 in the plate to receive screws 11 on the box A for the purpose of adjustably securing the box in the frame portion. The plate also has notches 12 to permit the passage of the usual switch mounting ears $a$ on the box when inserting the box into the frame.

As is well known in this art, switch boxes are commonly made sectional so that they may be built up to different sizes. In order that our improved mounting may accommodate different sizes of boxes the plate is provided with relatively weak portions 13 formed by notches 14 in the frame portion located along the vertical median line of the box opening in alinement with the notches 12, so that the plate may be broken along this line and the halves of the frame portion will then be spaced apart to embrace opposite portions of the enlarged box and be secured thereto.

The securing or bracket portion of the plate 5 is provided with two prongs 15 perpendicular to the plate and extending backwardly in the opposite direction from the lugs 8 and flanges 6, 7. These prongs 15 may be formed by notching the plate and bending the severed portions to the proper position. Said prongs serve to position the device with reference to the studding C to which it may be secured by nails or screws 16 passing through apertures 17 in the plate.

Should it be desirable to secure the box closer to the studding than is shown in Fig. 1, the prongs 15 are placed to the right of the studding instead of the left and the device secured thereto through apertures 18. By driving the prongs 15 into the studding and using either set of apertures to secure, any intermediate position of the box may be had. A plurality of larger orifices 19 are provided in the plate to allow passage of the mortar so as to interlock the plaster coating.

In practice the box A is attached to the frame portion by means of the screws 11 in the slots 9. The entire unit is then inserted in the opening provided by cutting off and notching the proper laths, all parts of the plate being behind the lath and the severed end or ends of the lath being inserted in the pocket formed by the plate and the flange 7 with its angular edge 7ª. The prongs 15 are positioned against the studding and the device secured to the studding through apertures 17 or 18. The open face of the box may then be moved into the plane of the plaster on the wall and secured in place by the screws 11.

The position of the laths B is indicated in dotted lines in Fig. 1, the middle lath being entirely severed and the upper and lower ones being notched to accommodate the switch box. The plate however, lies behind and forms a backing for these severed and weakened laths and therefore provides a stable base for the plaster coating.

The entire device may be stamped out on a punch press and may therefore be very cheaply manufactured.

We claim as our invention:

1. A mounting for switch boxes or the like comprising, in combination, a frame having a portion to embrace the box and a securing portion to be attached to a support, means on the free end of the frame portion adapted to receive the ends of cut-off laths, said frame portion being weakened at points along two of its sides to facilitate breaking the frame portion into two sections for the accommodation of boxes of larger size, and means on each of said frame sections arranged to receive fastening devices on a box.

2. A mounting for switch boxes or the like comprising, in combination, a frame recessed to receive a box and having a lath-receiving channel at one side and a bracket portion at its other side for attachment to a support, pairs of lugs on the two remaining sides of the frame having slots to receive screws carried by the box for fixing the box in the frame, the frame also having notches intermediate said lugs to permit the passage of the switch-mounting ears on the box and having opposed notches in alinement with the first mentioned notches, all of said notches being positioned to provide weakened portions in the frame to facilitate breaking the latter for the accommodation of boxes of larger size.

In testimony whereof we have hereunto affixed our signatures.

CHESTER A. JOHNSON.
GUSTAV NYBERG.